Feb. 1, 1949.　　　S. CASPER　　　2,460,676
MAGNETO TESTER

Filed Aug. 10, 1945　　　　　　2 Sheets-Sheet 1

INVENTOR.
SAMUEL CASPER
BY
Boyken, Mohler & Beckley
HIS ATTORNEYS

Feb. 1, 1949. S. CASPER 2,460,676
MAGNETO TESTER
Filed Aug. 10, 1945 2 Sheets-Sheet 2

INVENTOR.
SAMUEL CASPER

Patented Feb. 1, 1949

2,460,676

UNITED STATES PATENT OFFICE 2,460,676

MAGNETO TESTER

Samuel Casper, San Francisco, Calif.

Application August 10, 1945, Serial No. 609,964

6 Claims. (Cl. 73—118)

1

This invention relates to a tester for use in testing magnetos and the like.

The use of a tester for magnetos is old and most testers have provision for driving the magnetos at different speeds. Such testers incorporate a transmission for several speeds and a variable speed reversible motor. Also a contact assembly is provided that includes a movable rotary gap scale for checking impulse lag angles and also the conventional star wheel spark gap testing elements are included. These are old in the art but heretofore, in so far as I am aware, no provision has been made for supporting the apparatus to be tested in upright and inverted positions and in any inclined position between said upright and inverted positions without going to considerable trouble.

The main object of this invention is the combination of a magneto tester and means for supporting such magneto in any desired position between upright and inverted position without disconnecting the magneto from the tester and without stopping the rotation of the magneto.

Another object of the invention is the provision of a magneto tester that is adapted to support the magneto in any desired degree of revolution about the axis of its armature shaft while the magneto is being driven at the desired speed.

Other objects and advantages will appear in the description and in the drawings.

In the drawings

Fig. 5 is an edge view of the filler block that is indicated in Fig. 4 shown separately from the support.

In detail the tester comprises a housing 1 that encloses the conventional transmission gears between a drive shaft 2 that is driven by a variable

Figure 1:
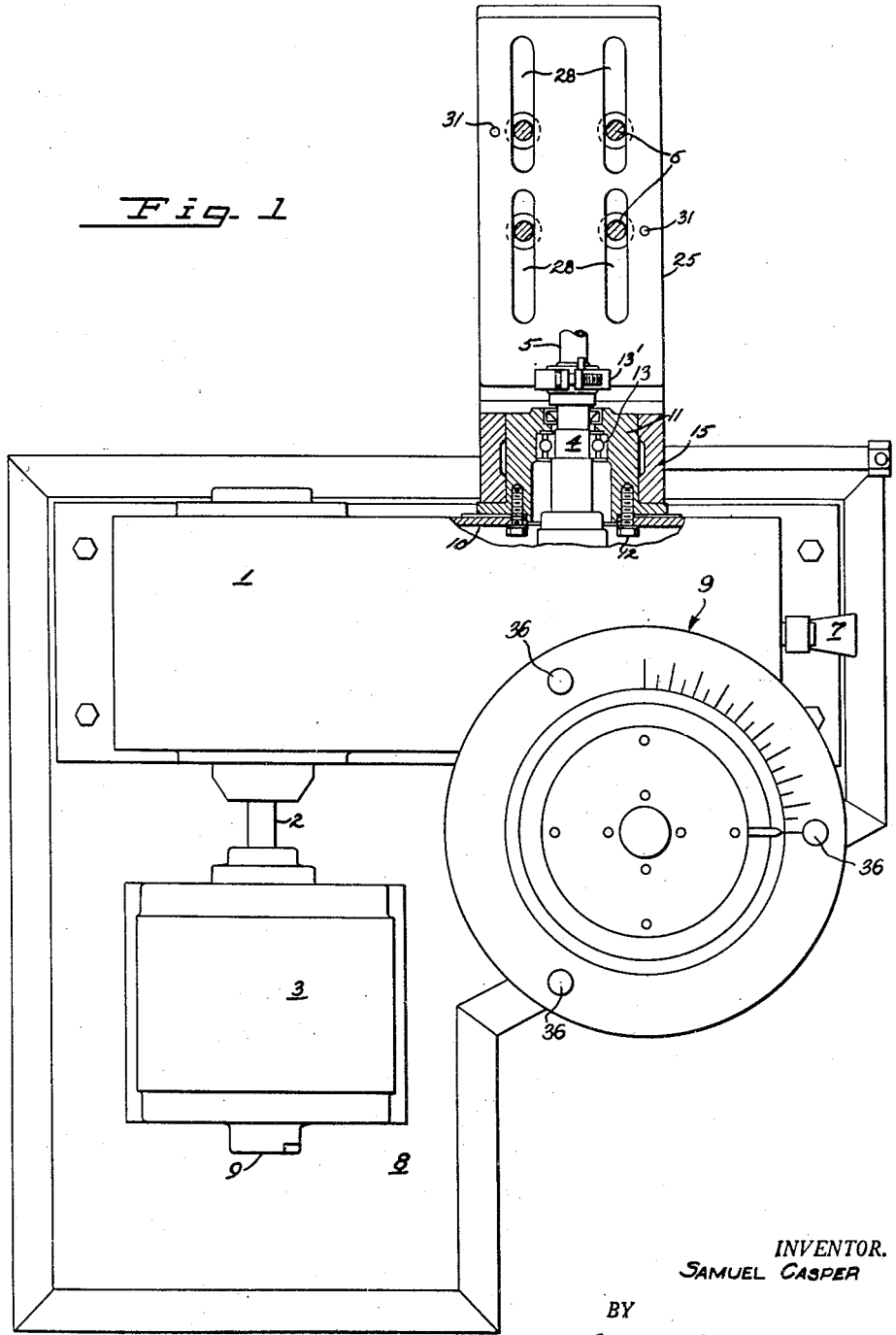
Fig. 1 is a plan view of the magneto tester including the magneto holder and which view is partially broken away and in section for clarity.

2 speed reversible motor 3 and a driven shaft 4 with which the magneto shaft 5 is connected, the magneto not being shown in Fig. 1 but the bolts 6 for securing the magneto to the support therefor being indicated in section.

The gears within the tester are adapted to be shifted by means of the lever 7 that is adjacent one side of the housing.

Preferably the housing 1 and the motor 3 are secured on a common base, an extension 8 of said base being for the motor. The contact assembly is generally indicated at 9 which assembly includes conventional plugs and a contact wire stud. No claim is made herein to the contact assembly or to the transmission elements within the housing, all of which are old in the art.

The side wall 10 of housing 1 is formed with an opening through which the driven shaft 4 extends and a cylindrical bearing member 11 concentric with said shaft 4 is secured to the wall 10 by bolts 12. This member 11 virtually constitutes a boss on the side wall 10 but is removable by reason of bolts 12 although it may be formed integral with the wall 10.

A bearing 13 is within the outer end of the member 11 for the shaft 4 and said shaft projects outwardly of said member 11 for securement to shaft 5 of the magneto by means of a detachable coupling 13'. Thus the bearing 13 is close to said coupling which is highly desirable.

Figure 2:
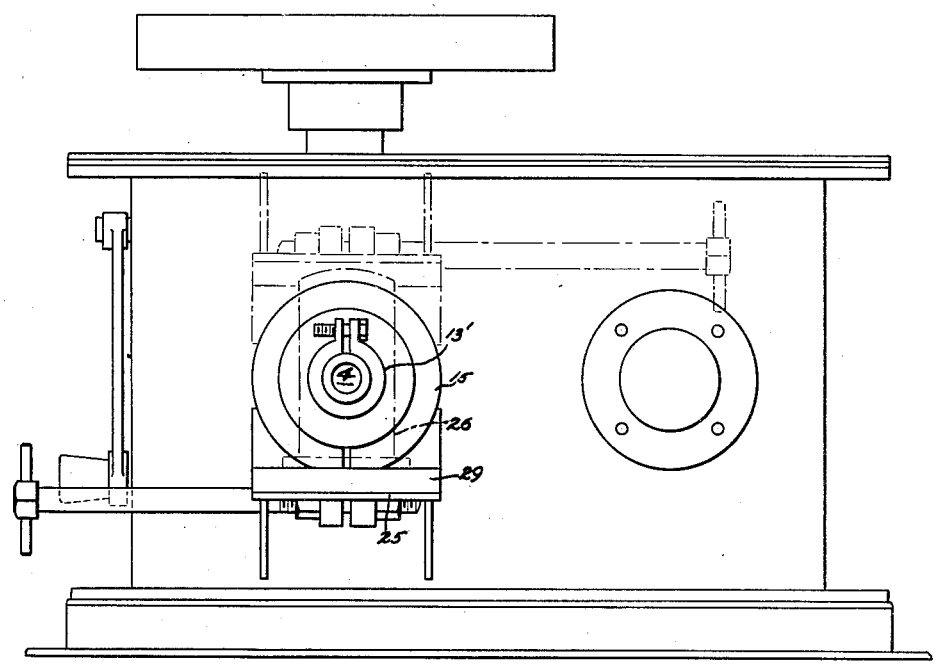
Fig. 2 is a side elevational view of the magneto tester of Fig. 1 looking from the side that is adapted to carry the magneto, the magneto being indicated in dot-dash lines and the support therefor being shown in full line for supporting the magneto upright and in dotted line for supporting the magneto in inverted position.
Figures 3, 4:
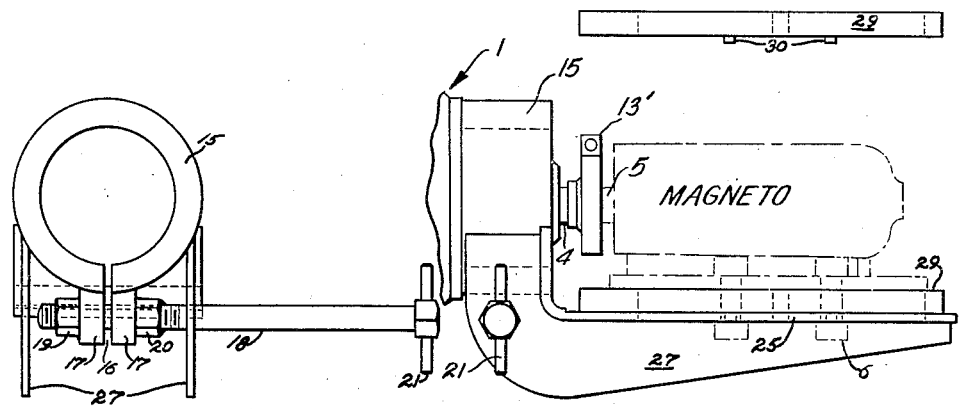
Fig. 3 is an end view of the support for the magneto looking from the end that is normally adjacent the housing of the tester.
Fig. 4 is a side elevational view of the support of Fig. 3 the base of a magneto being indicated in dot-dash lines as well as bolts for securing the magneto base to the support.

The outer cylindrical sides of the bearing member 11 constitute a bearing surface for a split cylindrical sleeve 15 (Figs. 2, 3, 4). This sleeve 15 is split at 16 on one side only and opposed lugs 17 on said sleeve projecting generally radially outwardly of the latter at opposite sides of the gap 16 are formed with coaxial openings for freely passing the threaded end portion of a rotary clamping rod 18. A nut 19 is welded to the outer side of one of the lugs 17 (Fig. 3) and which lug is adjacent the outermost end of rod 18. The threaded end portion of said rod is in threaded engagement with the threads of said nut. A second nut 20 is threaded on the outer end of rod 18 adjacent the other of said lugs 17 and this nut is welded to the rod 18. Thus upon rotating the rod 18 in one direction by means of the handle 21 the lugs 17 will be drawn toward each other to releasably lock or secure the sleeve 15 on the member 11 while rotation of the rod in the opposite direction will free the sleeve for rotation on said member.

Secured to the sleeve 15 is a shelf-like support 25 that comprises a horizontal plate that extends parallel with the central axis of the bearing member 11 which means that it is also parallel with the driven shaft 4 and magneto shaft 5 when the magneto (indicated in dot-dash lines 26 in Fig. 2) is carried on the support 25.

Parallel, spaced vertically disposed ribs 27 are secured to the support 25 below the latter and to the sleeve 15 to rigidly hold the support with respect to sleeve 15 against any likelihood of springing under the weight of the magneto.

The supporting plate 25 is formed with pairs of slots 28 (Fig. 1) that are parallel and that extend longitudinally of the plate. Bolts 6 extend through these slots for securing the magneto to the support. The slots enable adjustment of the magneto on the support as well as adjustment of the bolts relative to each other.

In some instances the use of a filler plate 29 (Figs. 2, 3, 5) is desirable in order to insure coaxial alignment of the driven shaft 4 with the magneto shaft 5. In such instances the plate 29 is of the desired thickness and is provided with slots identical with slots 28 in support 25. Dowel pins 30 (Fig. 5) projecting from the underside of plate 29 are adapted to fit in recesses 31 (Fig. 1) in support 25 for holding the filler plate against shifting on the support 25.

In actual practice the magneto may first be placed on support 25 (or filler plate 29 when the latter is used), it being understood that the sleeve is secured on member 11 supporting the shelf-like support 25 horizontal. The magneto is then moved toward shaft 4 so that the magneto shaft 5 moves into the coupling 13' and is in axial alignment with the shaft 4. The magneto is then rigidly secured to support 25 by bolts 6 (Figs. 1, 4) that extend through slots 28. The desired electrical connections between the magneto and the terminal posts 36 of contact assembly 9 of the tester is made in the usual manner by the electrical conductors on the magneto and the motor 3 is engaged to cause actuation of the magneto.

By unloosening the sleeve 15 by actuation of handle 21 on clamping rod 18 the magneto may be swung to any position about the axis of shafts 4, 5 within 360° and can be held in any position in such circle by merely tightening the sleeve 15 on the member. Testing in any position of the magneto is thus made possible without even stopping the motor or magneto although the operator may stop the same during swinging of the magneto if he so desires. However, in no event does he need to disconnect the magneto from the tester.

It is to be understood that the foregoing description and the drawings are not to be considered restrictive of the invention but merely illustrative thereof.

I claim:

1. In a tester for a magneto and the like having power transmission elements including a drive shaft adapted to be connected with a source of power, and a horizontally extending driven shaft, a housing enclosing said elements having a side wall through which said driven shaft extends, a cylindrical bearing member concentric with the axis of said driven shaft secured rigidly to said side wall, a sleeve rotatably supported on said bearing member, means for releasably securing said sleeve to said member at any point in its rotation on the latter, means on said sleeve rigid therewith for carrying a magneto with the shaft of the latter in alignment with said driven shaft, and means for releasably securing said driven shaft to such magneto shaft.

2. In combination with a tester for a magneto and the like in which said tester has a power driven shaft adapted to be connected to a magneto shaft, a magneto support revolvable about the axis of said driven shaft, means for securing said support stationary at any point in its revolvable movement about said axis, and means for securing a magneto on said support with its shaft in axial alignment with said driven shaft and in substantially abutting relation to the latter for connection therewith.

3. In combination with a tester for a magneto and the like in which said tester has a power driven shaft adapted to be connected to a magneto shaft, a magneto support revolvable about the axis of said driven shaft, means for securing said support stationary at any point in its revolvable movement about said axis, and means for securing a magneto on said support with its shaft in axial alignment with said driven shaft and in substantially abutting relation to the latter for connection therewith, said support including a base member on which the magneto to be tested is adapted to be supported, said base member extending generally parallel with the axis of said driven shaft and offset to one side of the latter, and means for securing a magneto to said base member with its shaft in axial alignment with said driven shaft for coupling thereto.

4. In combination with a tester for a magneto and the like in which said tester has a power driven shaft adapted to be connected to a magneto shaft, a magneto support revolvable about the axis of said driven shaft, means for securing said support stationary at any point in its revolvable movement about said axis, and means for securing a magneto on said support with its shaft in axial alignment with said driven shaft and in substantially abutting relation to the latter for connection therewith, said support including a base member on which the magneto to be tested is adapted to be supported, said base member extending generally parallel with the axis of said driven shaft and offset to one side of the latter, and means for securing a magneto to said base member with its shaft in axial alignment with said driven shaft for coupling thereto, a filler block adapted to be supported on said base member against which the base of such magneto is adapted to be secured, said filler block and said base member being correspondingly slotted for passing bolts to secure such magneto to said base member.

5. In a tester for a magneto and the like having power transmission elements including a drive shaft adapted to be connected with a source of power and a horizontally extending driven shaft, a housing enclosing said elements having an outer side wall provided with an outwardly projecting cylindrical boss having a through bore through which said driven shaft extends, a magneto support revolvably carried on said boss and projecting outwardly of said wall, means on said support for supporting a magneto thereon with its shaft in axial alignment with said driven shaft, means for releasably securing said support to said boss at any point in its revolvable movement thereon.

6. In a tester for a magneto and the like having power transmission elements including a drive shaft adapted to be connected with a source of power and a horizontally extending driven shaft, a housing enclosing said elements having an outer side wall provided with an outwardly projecting cylindrical boss having a through bore through which said driven shaft extends, a magneto support revolvably carried on said boss and projecting outwardly of said wall, means on said support for supporting a magneto thereon with its shaft in axial alignment with said driven shaft, means for releasably securing said support to said boss at any point in its revolvable movement thereon, said last mentioned means comprising a shelf-like base member offset to one side of the axis of said boss and extending parallel with such axis, said member being apertured for passing bolts to secure such magneto to said member.

SAMUEL CASPER.

REFERENCES CITED

The following references are of record in the file of this patent:

UNITED STATES PATENTS

| Number | Name | Date |
|---|---|---|
| 1,349,633 | Staley | Aug. 17, 1920 |
| 1,394,215 | Onan | Oct. 18, 1921 |
| 1,397,296 | Schaf et al. | Nov. 15, 1921 |
| 1,445,923 | Wilder | Feb. 20, 1923 |
| 1,874,259 | Dugan | Aug. 30, 1932 |
| 1,960,614 | Anderson | May 29, 1934 |
| 2,306,461 | Miller | Dec. 29, 1942 |

Certificate of Correction

Patent No. 2,460,676. February 1, 1949.

SAMUEL CASPER

It is hereby certified that error appears in the above numbered patent requiring correction as follows:

In the drawing, Fig. 1, should appear as shown below instead of as shown in the patent—

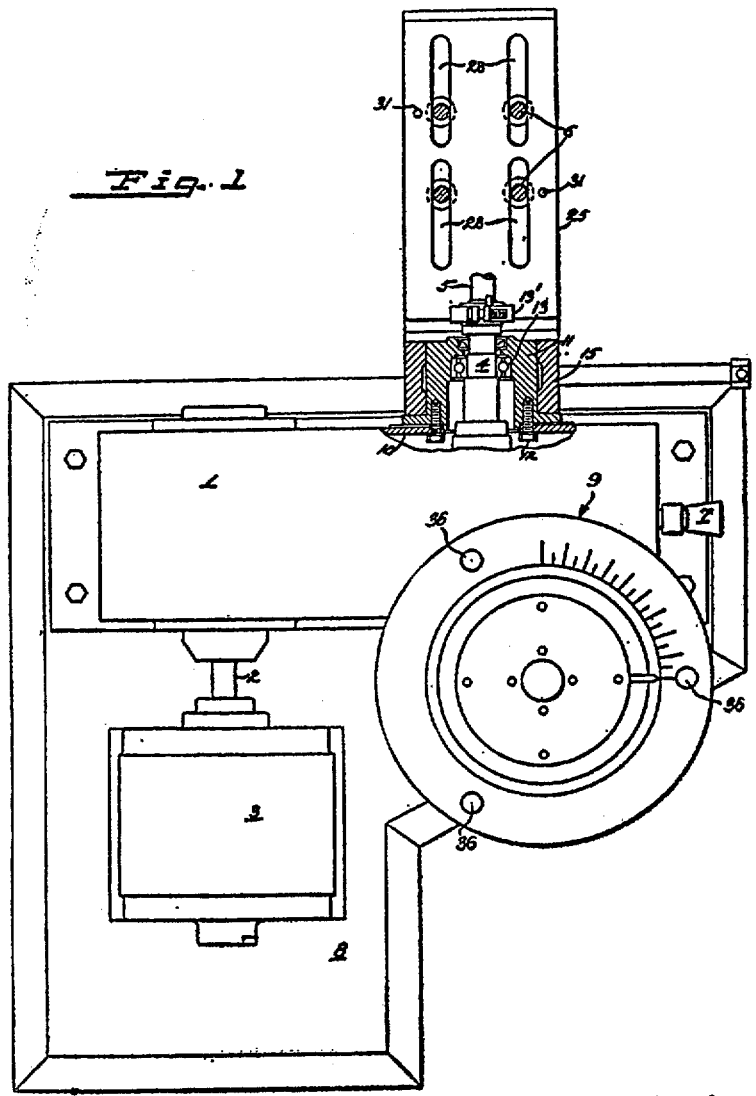

and that the said Letters Patent should be read with this correction therein that the same may conform to the record of the case in the Patent Office.

Signed and sealed this 12th day of July, A. D. 1949.

[SEAL]

THOMAS F. MURPHY,
*Assistant Commissioner of Patents.*